Feb. 10, 1948. T. A. WERKENTHIN 2,435,617
TRACKED VEHICLE OR CRAFT CONSTRUCTION
Filed Dec. 17, 1945 2 Sheets-Sheet 1
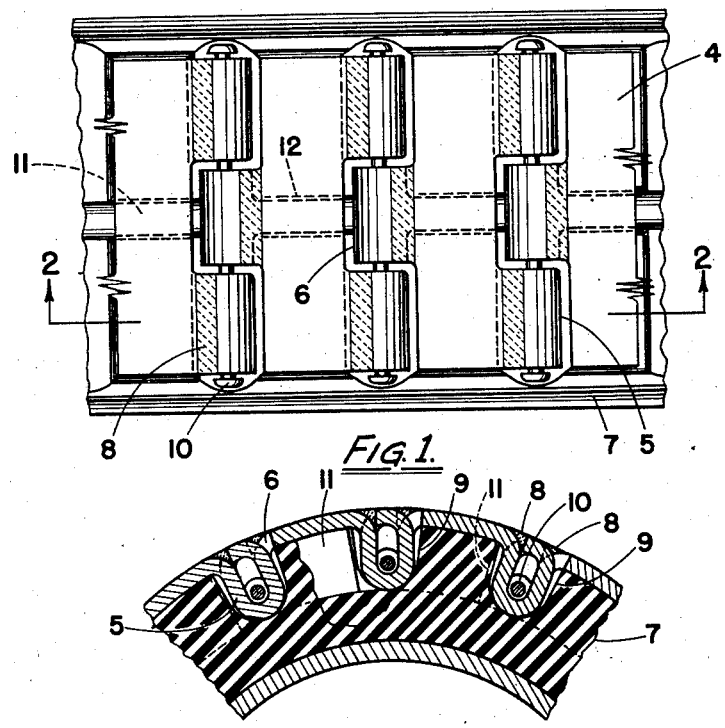
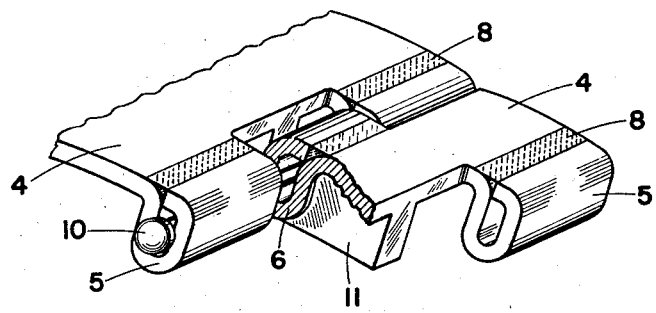
Inventor
THEODORE A. WERKENTHIN
By Ralph L. Chappell
Attorney Feb. 10, 1948.  T. A. WERKENTHIN  2,435,617
TRACKED VEHICLE OR CRAFT CONSTRUCTION
Filed Dec. 17, 1945  2 Sheets-Sheet 2

Inventor
THEODORE A. WERKENTHIN
By Ralph Chappell
Attorney

Patented Feb. 10, 1948

2,435,617

UNITED STATES PATENT OFFICE 2,435,617

TRACKED VEHICLE OR CRAFT CONSTRUCTION

Theodore A. Werkenthin, Arlington, Va.

Application December 17, 1945, Serial No. 635,450

3 Claims. (Cl. 305—1)

(Granted under the act of March 3, 1883, as amended April 30, 1928; 370 O. G. 757)

This invention relates to improvements in bogie wheels or the like particularly for use in vehicles or craft embodying endless propelling tracks which pass over and engage such bogie wheels.

More particularly the invention relates to a flexible sheathing of metal or the like embodied in a rubber or like surface of the bogie wheel for contact with the endless track of the tracked vehicle or craft.

An object of the invention is the provision of a flexible sheathing or covering of metal or other wear resistant material so mounted in the rubber or like surface of the bogie wheel or the like as to provide impact and tear resistance to the rubber wheel materially increasing the life thereof, while retaining the shock absorbing characteristics of the rubber or synthetic rubber of the wheel.

Another object of the invention is to provide such a sheathing or covering for the wheel of rubber or the like which will permit a portion of the sheathing or covering engaged by the track to deflect under impact of the track.

A further object of the invention is to provide a bogie wheel of rubber or the like embodying a linked or articulated sheathing or covering of metal or other hard material in the form of sections or links held together by pins, the said pins having a slight lateral freedom of movement and a considerable vertical freedom of movement whereby the portion of rubber beneath the links or segments of the sheathing may be freely compressed as pressure is applied to the wheel through contact with the endless propelling track.

Other objects will be made apparent in the accompanying description having reference to the accompanying drawings which are exemplary and in which:

Fig. 1 is an expanded plan view of a portion of the surface of a bogie wheel according to one embodiment of the invention.

Fig. 2 is a sectional view of a portion of the bogie wheel substantially on the line 2—2 shown in Fig. 1;

Fig. 3 is a fragmentary perspective view of the linked flexible sheathing;

Figure 6:
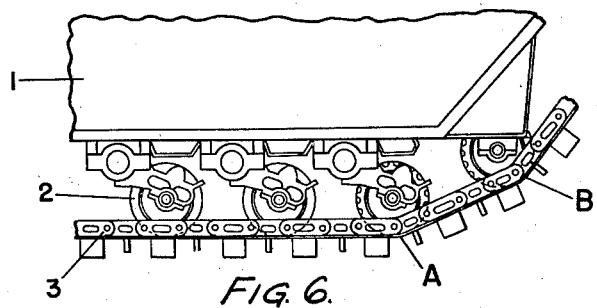
Fig. 6 is a fragmentary view showing the bogie wheels mounted on the vehicle or craft and in connection with the endless propelling track thereof.

Referring to the drawings, in the operation of endless track propelled vehicles or craft a fragmentary portion of one of which is indicated in Fig. 6 at numeral 1, solid rubber tired bogie wheels 2 are usually employed with the endless propelling track 3. At points such as those marked A and B in Fig. 6, where the track changes direction, the bogie wheels are subjected to a pinching action by links of the endless track. This action has a deleterious effect on the rubber tired bogie wheels in these indicated locations and results in their failure at a much faster rate than the other bogie wheels.

The present invention provides a construction of rubber covered bogie wheels including a flexible articulated or linked sheathing or covering of metal or the like for the rubber or like surface of the bogie wheels which serves to protect the rubber or like surface of the bogie wheel from the pinching action of the track and prevents undue wear on the track and on the bogie wheel and yet allows the rubber or the like of the bogie wheel to serve as a shock absorber under the flexible articulated sheathing.

It has previously been proposed to provide a solid or continuous strip or rim of metal or the like around the circumference of the rubber surfaced bogie wheel. Such a construction is subject to distortion and flattening under impact or pinching action of the track. The present invention by the provision of linked sections or segments of metal or the like around the circumference provides full protection with yieldability and flexibility and tendency to recover to normal condition following the application of pressure by contact with the track in use.

Referring to Figs. 1, 2 and 3, a sheathing or covering of metal or the like may desirably comprise an articulate series of link members or sections 4 which have depending portions 5 and 6 thereof received in openings or recesses 9 in the rubber tire or surfaces 7 of the bogie wheel. The depending portions 5 and 6 of the links or sections 4 are in the form of loops formed by bending the metal of the link substantially back upon itself in the form of a knuckle-joint and may desirably be welded as indicated at 8. The rubber or synthetic rubber surface of the bogie wheel is provided with the transverse recesses or grooves 9 spaced about the periphery thereof and which receive the depending loops 5 and 6 of the links or sections of the flexible sheathing.

Each link or section may desirably be formed so as to cooperate with the adjoining link or section. At the ends of the links or sections the depending loops 5 and 6 of the links are formed so as to be complementary with depending loops of adjoining links and forming a connection by means of pins or the like 10 which pass through the aligned complementary loops of the links. Thus each link or section has a single narrow depending loop 6 at one side thereof and a pair of loops 5 at the opposite side thereof spaced apart to receive the single loop 6 of the adjacent link.

Desirably the openings of the loops 5 and 6 are of such size in relation to the pins 10 as to provide for slight lateral play or movement of the pins in the openings of the loops. The loops are preferably elongated radially of the wheel as indicated in the drawings which provides for freedom of movement in the flexing of the sheathing under contact with the track by permitting relative movement between the links and the pins enabling the links to be pressed against and to compress the rubber.

Each link is preferably provided with a depending rib 11 which is received in a circumferential groove 12 formed in the rubber tire of the bogie wheel. This construction of the bogie wheel and linked sheathing prevents excessive lateral movement of the flexible sheathing in relation to the bogie wheel, and assists in retaining the sheathing in proper position thereon.

Figure 4:
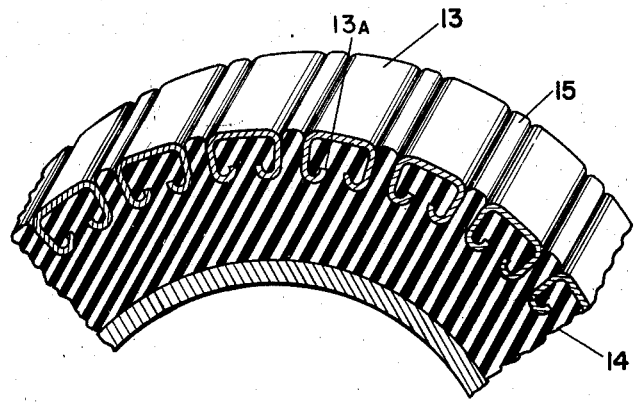
Fig. 4 is a view of a modified form of the invention.
Figure 5:
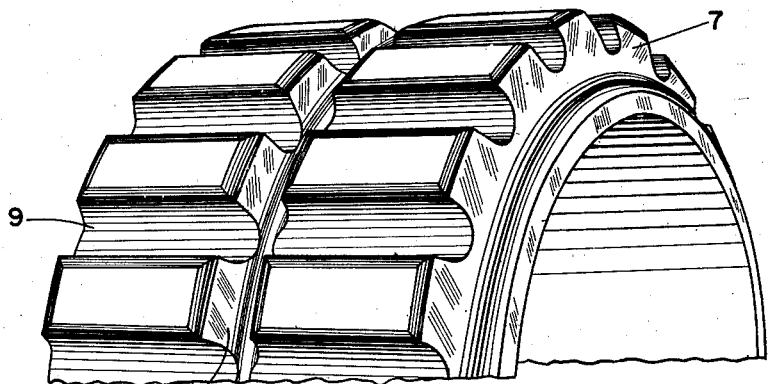
Fig. 5 is a perspective view of a portion of the rubber covered rim of the bogie wheel.

In the modified form of the invention shown in Fig. 4 segmental sheathing members of metal or the like 13 are provided. These are embedded or received in recesses in the rubber surface 14 of the bogie wheel. In this form of construction the sheathing members 13 are not interconnected and portions 15 of the rubber surface of the bogie wheel are disposed between the sheathing members 13. The underlying rubber will permit the section to deflect under impact of the track. In this form of the invention, the metal sections 13 are preferably molded into the rubber and may desirably have overturned ends 13a anchoring them in the rubber.

It will be understood that various modifications may be made without departing from the spirit and scope of the invention which is only to be limited by the terms of the appended claims.

The invention may be manufactured and used by or for the Government of the United States of America for governmental purposes without the payment of any royalties thereon or therefor.

What is claimed is:

1. In a bogie wheel construction for vehicles or craft propelled by an endless track, said bogie wheel having a rubber or like surface provided with transverse grooves spaced about its periphery, and sectional link members of metal or the like having depending looped portions received in said recesses and connected by transverse pins extending through the loops, said articulated links or sections providing a flexible sheathing or covering for the rubber surface of the wheel, each of said links or sections having a centrally located loop at one side thereof and spaced apart depending loops at the opposite side thereof to receive the central loop of the adjacent link.

2. In a bogie wheel construction for vehicles or craft propelled by an endless track, said bogie wheel having a rubber or like surface provided with transverse grooves spaced about its periphery, and sectional link members of metal or the like having depending looped portions received in said recesses and connected by transverse pins extending through the loops, said articulated links or sections providing a flexible sheathing or covering for the rubber or like surface of the wheel, each of said links or sections having a centrally located loop at one side thereof and spaced apart depending loops at the opposite side thereof to receive the central loop of the adjacent link, said links each being provided with a depending rib disposed in a direction transverse to the direction of the pin and loop, and said rubber surfaced wheel having a circumferential groove therein receiving the ribs of the links to prevent excessive lateral movement of the flexible sheathing and to assist in retaining it in position on the wheel.

3. In a bogie wheel construction for vehicles or craft propelled by an endless track, said bogie wheel having a rubber or like surface provided with transverse grooves spaced about its periphery, and sectional link members of metal or the like having depending looped portions received in said recesses and connected by transverse pins extending through the loops, said articulated links providing a flexible sheathing or covering for the rubber or like surface of the wheel, each of said links having a centrally located loop at one side thereof and spaced apart depending loops at the opposite side thereof to receive the central loop of the adjacent link, and said depending loops of the links or sections being elongated downwardly or radially of the wheel and providing openings substantially longer than the diameter of the pins and slightly wider than the diameter of the pins to provide freedom of action in the flexible metal sheathing or covering under contact with the endless propelling track.

THEODORE A. WERKENTHIN.

REFERENCES CITED

The following references are of record in the file of this patent:

UNITED STATES PATENTS

| Number | Name | Date |
| --- | --- | --- |
| 1,307,036 | Bretscher | June 17, 1919 |